(12) United States Patent
Clausi et al.

(10) Patent No.: US 11,732,468 B2
(45) Date of Patent: *Aug. 22, 2023

(54) SOUND ATTENUATING LAMINATE MATERIALS

(71) Applicants: Robert N. Clausi, Oakville (CA); Salvatore Anthony Diloreto, Ancaster (CA)

(72) Inventors: Robert N. Clausi, Oakville (CA); Salvatore Anthony Diloreto, Ancaster (CA)

(*) Notice: Subject to any disclaimer, the term of this patent is extended or adjusted under 35 U.S.C. 154(b) by 227 days.

This patent is subject to a terminal disclaimer.

(21) Appl. No.: 17/197,848

(22) Filed: Mar. 10, 2021

(65) Prior Publication Data

US 2021/0207367 A1    Jul. 8, 2021

Related U.S. Application Data

(63) Continuation of application No. 16/390,322, filed on Apr. 22, 2019, now Pat. No. 11,041,305, which is a
(Continued)

(51) Int. Cl.
*E04B 1/84* (2006.01)
*E04F 15/20* (2006.01)
(Continued)

(52) U.S. Cl.
CPC ............... *E04B 1/84* (2013.01); *B32B 21/02* (2013.01); *B32B 21/045* (2013.01); *B32B 21/06* (2013.01);
(Continued)

(58) Field of Classification Search
CPC .... E04B 1/84; E04B 1/82; E04F 15/20; E04F 15/02; E04F 15/04; E04F 15/041;
(Continued)

(56) References Cited

U.S. PATENT DOCUMENTS 3,150,031 A    9/1964    Powell
3,770,536 A    11/1973    Haigh
(Continued)

FOREIGN PATENT DOCUMENTS

CA    2538132 A1    3/2005
CA    2401197 C    12/2006
(Continued)

OTHER PUBLICATIONS

Non-Final Office Action dated Feb. 24, 2022 in associated U.S. Appl. No. 16/497,857 (8 pages).
(Continued)

*Primary Examiner* — Edgardo San Martin
(74) *Attorney, Agent, or Firm* — Olive Law Group, PLLC (57) ABSTRACT

Sound absorbing or attenuating laminate flooring materials are provided, which are directed to be used in the production of floor covering, floor panels, furniture panels, cabinets, counter-tops and wall panels. As well, the methods for producing such products are provided. In particular, abrasion resistant panels, with a laminated structure, created by forming an assembly which consists of laminating a heat-activated resin impregnated paper wear layer, a decorative layer with printed graphics or a wood veneer decorative layer, a medium density (MDF) or high-density (HDF) natural fiber-based core and a resin impregnated paper balancing layer. To achieve sound absorbing and/or attenuating properties, any or all paper layers may be pre coated with an additional flexible elastomeric coating, film or material prior to assembly of the panel, or the natural fiber core panel may be coated with a flexible elastomeric coating, film or material prior to assembly with the papers. The flexible elastomeric coating, film or material acts to absorb, reduce, and/or ameliorate the sound transmissions inherent in laminated panels.

27 Claims, 3 Drawing Sheets

Related U.S. Application Data continuation of application No. 15/484,674, filed on Apr. 11, 2017, now Pat. No. 10,287,771, which is a continuation of application No. 14/218,032, filed on Mar. 18, 2014, now Pat. No. 9,631,361, which is a continuation of application No. 13/147,204, filed as application No. PCT/CA2010/000155 on Feb. 3, 2010, now Pat. No. 8,678,133.

(60) Provisional application No. 61/149,519, filed on Feb. 3, 2009.

(51) Int. Cl.

| | |
|---|---|
| *B27N 3/06* | (2006.01) |
| *B32B 25/14* | (2006.01) |
| *B32B 27/10* | (2006.01) |
| *E04F 15/10* | (2006.01) |
| *B32B 21/02* | (2006.01) |
| *B32B 21/04* | (2006.01) |
| *B32B 21/06* | (2006.01) |
| *B32B 21/08* | (2006.01) |
| *B32B 21/14* | (2006.01) |
| *B32B 25/06* | (2006.01) |
| *B32B 25/12* | (2006.01) |
| *B32B 27/20* | (2006.01) |
| *B32B 27/30* | (2006.01) |
| *B32B 27/32* | (2006.01) |
| *B32B 27/36* | (2006.01) |
| *B32B 27/40* | (2006.01) |
| *B32B 27/42* | (2006.01) |
| *B44C 5/04* | (2006.01) |
| *E04F 15/02* | (2006.01) |

(52) U.S. Cl.
CPC .............. *B32B 21/08* (2013.01); *B32B 21/14* (2013.01); *B32B 25/06* (2013.01); *B32B 25/12* (2013.01); *B32B 25/14* (2013.01); *B32B 27/10* (2013.01); *B32B 27/205* (2013.01); *B32B 27/302* (2013.01); *B32B 27/304* (2013.01); *B32B 27/306* (2013.01); *B32B 27/308* (2013.01); *B32B 27/32* (2013.01); *B32B 27/36* (2013.01); *B32B 27/40* (2013.01); *B32B 27/42* (2013.01); *B44C 5/04* (2013.01); *E04F 15/02* (2013.01); *E04F 15/102* (2013.01); *E04F 15/107* (2013.01); *E04F 15/206* (2013.01); *B32B 2255/08* (2013.01); *B32B 2255/12* (2013.01); *B32B 2255/26* (2013.01); *B32B 2260/028* (2013.01); *B32B 2260/046* (2013.01); *B32B 2264/02* (2013.01); *B32B 2307/10* (2013.01); *B32B 2307/412* (2013.01); *B32B 2307/536* (2013.01); *B32B 2307/546* (2013.01); *B32B 2307/554* (2013.01); *B32B 2307/75* (2013.01); *B32B 2471/00* (2013.01); *B32B 2479/00* (2013.01); *B32B 2607/00* (2013.01); *E04F 2290/042* (2013.01); *E04F 2290/043* (2013.01); *Y10T 156/10* (2015.01)

(58) Field of Classification Search
CPC ....... E04F 15/042; E04F 15/10; E04F 15/102; E04F 15/107; B32B 21/04; B32B 21/02; B27N 3/00; B27N 3/02; B27N 3/04; B27N 3/06; G10K 11/168
See application file for complete search history.

(56) References Cited

U.S. PATENT DOCUMENTS

| | | |
|---|---|---|
| 4,828,910 A | 5/1989 | Haussling |
| 6,006,486 A | 12/1999 | Moriau et al. |
| 6,440,538 B1 | 8/2002 | Ungar |
| 6,442,912 B1 | 9/2002 | Phillips et al. |
| 6,767,630 B2 | 7/2004 | Okuyama |
| 6,818,286 B2 | 11/2004 | Döhring |
| 6,893,713 B2 | 5/2005 | Sjoberg et al. |
| 7,318,498 B2 | 1/2008 | Woodman et al. |
| 7,500,541 B2 | 3/2009 | Schmidt et al. |
| 8,678,133 B2 | 3/2014 | Clausi et al. |
| 2003/0024199 A1 | 2/2003 | Pervan et al. |
| 2003/0136494 A1 | 7/2003 | Windmoller et al. |
| 2004/0065507 A1 | 4/2004 | Jacobsen |
| 2004/0134587 A1 | 7/2004 | Broberg et al. |
| 2004/0163331 A1 | 8/2004 | Peng et al. |
| 2005/0050846 A1 | 3/2005 | Surace et al. |
| 2005/0118398 A1 | 6/2005 | Reichwein et al. |
| 2006/0008630 A1 | 1/2006 | Thiers et al. |
| 2006/0057345 A1 | 3/2006 | Surace et al. |
| 2006/0108175 A1 | 5/2006 | Surace et al. |
| 2008/0264721 A1 | 10/2008 | Tinianov et al. |
| 2009/0000245 A1 | 1/2009 | Tinianov et al. |
| 2009/0188746 A1 | 7/2009 | Yamada et al. |
| 2009/0280356 A1 | 11/2009 | Tinianov et al. |
| 2010/0111192 A1 | 5/2010 | Graves |
| 2010/0170746 A1 | 7/2010 | Restuccia et al. |
| 2010/0230206 A1 | 9/2010 | Tinianov et al. |
| 2011/0111192 A1 | 5/2011 | Lloveras Calvo |
| 2011/0165429 A1 | 7/2011 | Tinianov et al. |
| 2012/0276348 A1 | 11/2012 | Clausi et al. |
| 2014/0170356 A1 | 6/2014 | Maziers |
| 2014/0170359 A1 | 6/2014 | Schwitte et al. |
| 2014/0242342 A1 | 8/2014 | Vandevoorde et al. |
| 2017/0233953 A1 | 8/2017 | Kipphardt et al. |

FOREIGN PATENT DOCUMENTS

| | | |
|---|---|---|
| CA | 2481838 C | 11/2011 |
| GB | 688373 A | 3/1953 |
| WO | 03016655 A1 | 2/2003 |
| WO | 2009050565 A1 | 4/2009 |

OTHER PUBLICATIONS

Healthy Business Network, "Alternative Resin Binders for Particleboard, Medium Density Fiberboard (MDF), and Wheatboard", Global Health & Safety Initiative, May 1, 2018, 1-6. (Six (6) pages).
Canadian Office Action issued in counterpart CA Application No. 2751164 filed Feb. 3, 2010, dated Jul. 25, 2013. (Two (2) pages).
Response to Canadian Office Action issued in counterpart CA Application No. 2751164 filed Feb. 3, 2010, dated Jun. 25, 2013. (Fourteen (14) pages).
Canadian Office Action issued in counterpart CA Application No. 2751164 filed Feb. 3, 2010, dated Mar. 25, 2013. (Four (4) pages).
Final Office Action issued in counterpart U.S. Appl. No. 13/147,204 dated Jul. 2, 2013. (Eleven (11) pages).
Final Office Action issued in counterpart U.S. Appl. No. 14/218,032 dated May 20, 2016. (Nine (9) pages).
Final Office Action issued in counterpart U.S. Appl. No. 15/484,674 dated Mar. 7, 2019. (Six (6) pages).
International Search Report and Written Opinion for application No. PCT/CA2010/000155 filed Feb. 3, 2010, dated Mar. 11, 2010. (Ten (10) pages).
Medium Density Fiberboard, 2013, www.compositepanel.org/userfiles/filemanager/1391/, p. 6, (Ten (10) pages).
Non-Final Office Action issued in counterpart U.S. Appl. No. 15/484,674 dated Sep. 7, 2018. (Nine (9) pages).
Notice of Allowance issued in counterpart U.S. Appl. No. 15/484,674 dated Mar. 29, 2019. (Seven (7) pages).
Canadian Office Action in counterpart CA Application No. 2751164 filed Feb. 3, 2010, dated Jun. 25, 2013. (Fourteen (14) pages).

(56) References Cited

OTHER PUBLICATIONS

PARTICLEBOARD, 2013, www.compositepanel.org/userfiles/filemanager/1392, p. 5. (Nine (9) pages).
Response to Final Office Action filed in counterpart U.S. Appl. No. 15/484,674 dated Mar. 13, 2019. (Two (2) pages).
Response to Non-Final Office Action filed in counterpart U.S. Appl. No. 15/484,674 dated Feb. 7, 2019. (Five (5) pages).
Response to Restriction Requirement filed in counterpart U.S. Appl. No. 15/484,674 dated May 1, 2018. (Three (3) pages).
Restriction Requirement issued in counterpart U.S. Appl. No. 15/484,674 dated Mar. 22, 2018. (Four (4) pages).
Terminal Disclaimer filed in counterpart U.S. Appl. No. 15/484,674 dated Mar. 13, 2019. (Three (3) pages).
Non-Final Office Action issued in counterpart U.S. Appl. No. 13/147,204 dated Dec. 18, 2012. (Nine (9) pages).
Non-Final Office Action issued in counterpart U.S. Appl. No. 13/147,204 dated Sep. 30, 2013. (Eight (8) pages).
Non-Final Office Action issued in counterpart U.S. Appl. No. 14/218,032 dated May 29, 2015. (Seven (7) pages).
Notice of Allowance issues in counterpart U.S. Appl. No. 13/147,204 dated Jan. 30, 2014. (Two (2) pages).
Notice of Allowance issues in counterpart U.S. Appl. No. 14/218,032 dated Dec. 21, 2016. (Eight (8) pages).
Notice of Allowance issued in counterpart U.S. Appl. No. 16/390,322 dated May 14, 2021. (Seven (7) pages).

SOUND ATTENUATING LAMINATE MATERIALS

CROSS REFERENCE TO RELATED APPLICATIONS

This application is a continuation of U.S. patent application Ser. No. 16/390,322, filed Apr. 22, 2019, which is a continuation of U.S. patent application Ser. No. 15/484,674, filed Apr. 11, 2017 (now U.S. Pat. No. 10,287,771), which is a continuation of U.S. patent application Ser. No. 14/218, 032, filed Mar. 18, 2014 (now U.S. Pat. No. 9,631,361), which is a continuation of U.S. patent application Ser. No. 13/147,204, filed Sep. 6, 2011 (now U.S. Pat. No. 8,678, 133), which is a 35 USC § 371 application of International PCT Patent Application Serial No. PCT/CA10/00155, filed Feb. 3, 2010, and further claims priority to U.S. Provisional Patent Application Ser. No. 61/149,519, filed Feb. 3, 2009; the entire contents of each are hereby incorporated by reference herein in their entireties.

FIELD OF THE INVENTION

This invention relates to sound absorbing (or sound attenuating) laminate materials, including floor coverings, floor panels, furniture panels, wall panels, cabinets, countertops, and the like, and additionally includes a method for producing such products. In particular, however, the present invention preferably relates to a floor covering material formed of laminated panels, which might also be called a laminated floor.

BACKGROUND OF THE INVENTION

It is known that laminated floor can be very noisy. The cause for this is the way in which the floor panels are produced. In the development of this product a great deal of attention was focused by manufacturers to making a product that had a hard wear-resistant surface with a moisture resistant core made typically made with a formaldehyde binder and wood particles. The ultra-hard wear layers applied to the upper and lower panel surfaces are harder and higher in density than the wood core layer and thereby tend to generate high pitched sounds. This tends to make the floor noisy.

The industry has responded to this noise concern by providing various sound-deadening foam and felt materials that are meant to absorb the sound generated by the laminate floor. However, these soft pads tend to reflect the sounds back into the panel which, being a good sound conductor, transmits the sound back into the room.

This noise problem is so serious that many municipalities do not allow laminate flooring to be installed in stacked dwellings such as apartment buildings and in some cases, do not allow laminate flooring to be installed in commercial offices. It should be noted that, typically, wood floors such as solid wood, or engineered wood floors, do not experience this problem to the same degree, since the wood substrate has a significantly lower density than the laminate floor core materials, and the urethane wear coatings used on these wood floors are flexible acting to further absorb sound.

As the name implies, laminate floor panels are made up of several layers. Typically, a laminate floor comprises a wear layer consisting of a translucent paper and a thermosetting resin with abrasive particles, a decorative paper or foil, an MDF (medium density fibreboard) or HDF (high density fibreboard) base or core panel, and a paper backing (or balancing) layer, which is also pre-impregnated with thermosetting resin. The entire loose assembly is placed into a press and compressed, under the supply of heat, in order to become one hardened whole. This technique is known as DPL (Direct Pressure Laminate).

Of course, other production techniques are also possible. For example, first a top layer may be formed which, amongst others, comprises the aforementioned decorative layer and the layer of synthetic material present thereupon, after which this formed top layer is attached to a basic layer or basic structure. This technique is known as HPL (High Pressure Laminate).

Additionally, impressions can be realized in the transparent wear layer in order to imitate a wood grain, stone or other textures, which are typically present at the surface of real wood or other materials such as ceramic tiles, leather, etc. In the prior art, this is typically performed by simply providing a series of impressions in the floor panels, which impressions typically extend in the same direction or in random directions.

SUMMARY OF THE INVENTION

The invention is directed to the production of laminated panels, including floor coverings, and in particular, at floor panels, whereby one or more layers comprising the laminated structure may be treated with an elastomeric coating, film or material, in order to reduce noise. As a result, the aforementioned noise disadvantages of the prior art are reduced, minimized, or eliminated.

A technical solution is thereby offered for absorbing the sound resonances, and thereby reducing the sound level and providing for reduced sound frequency.

Accordingly, in a first aspect, the present invention provides a sound attenuating laminated panel, having a laminate structure comprising a plurality of layers, wherein one or more layers comprising said laminate structure, have been treated with an elastomeric coating, film or material, so as to form a treated layer, in order to reduce the noise generated by said panel.

As usual with the known laminated floor panels, the upper and lower laminated layers, typically include printed decorative layers which preferably consist of paper which can be pre-treated with an additional elastomeric coating that may include hollow or solid plastic microspheres. However, other materials, either based on paper or cellulose or not, are not excluded.

Alternatively, however, a printed decoration can be printed directly on to the MDF or HDF core layer, and the decorative layer may thereby be eliminated. In such a case, the elastomeric material may be impregnated onto the decorated core layer, or, in some cases, substituted for the wear layer. In this later case, the elastomeric material can also be modified to include wear particles for improved wear resistance, as discussed herein.

Accordingly, using the concepts of the present invention, the entire panel assembly may be "tuned" to reduce noise depending upon the desired or selected characteristics of the core panel. Further, each of the paper or other layers may receive pre-impregnation and subsequent coatings of elastomeric material in varying thicknesses. The elastomeric material may also be of differing hardness, depending on the desired level of sound reduction.

The aforementioned layer or layers of elastomeric material, which, according to the present invention, is preferably situated throughout the core of the paper and above and/or below any or all paper layers, can be composed in any manner. By "elastomeric material" it is meant that this layer comprises an elastomeric material, applied in an appropriate thickness to reduce sound transmission without impeding the bonding of the paper layers to the core. This layer (or layers) of elastomeric material may comprise other materials than synthetic materials, as well as be composed of several sub-layers. The elastomeric material may also be a separate film or films in varying hardnesses and thicknesses. The elastomeric material layer is also typically and preferably transparent.

The elastomeric noise absorbing pre-impregnation solutions, coatings, films or materials may also be applied directly to the upper and/or lower surfaces of the preferably MDF or HDF core layer. An additional advantage to using an elastomeric coating or film, would be to effectively seal the panel and thereby eliminating or reduce the "off-gassing" of toxins which might be given off by the core panel where said core panel has been produced using formaldehyde, for example, as a binder.

Preferably, this elastomeric coating, film or material consists of or comprises a natural or synthetic resin with elastomeric properties, which has been applied, for example, in very thin layers to the paper layers and/or the wood core. The elastomeric coating, film or material can be thermoplastic or thermoset.

Substances such as hollow or solid plastic spheres may also be present in the elastomeric coating or film. The plastic spheres selected may be of various hardness and size depending upon the desired level of sound attenuation. The plastic microspheres may be of the expanding variety whereby they are gas filled and expand when subjected to heat from the fast-cycle press. The plastic microspheres may also be incorporated into a film that could be placed between one or more layers of the laminate floor panel assembly.

A further embodiment of the invention would be, to apply to the compressed wood core, an elastomeric tack coat with a roll-coating machine or curtain coating machine. Further, with this coating still uncured, a liberal sprinkling of thermoplastic microspheres to completely cover the surface could be applied. The panel would then proceed through a drying oven bonding the thermoplastic microspheres to the elastomeric tack coat. Any loose excess microspheres not bonded to the surface would be removed. An optional second coating, such as an elastomeric urethane top coat, would preferably be applied to the core and the core would proceed through a second drying oven. An assembly including the translucent thermoset wear layer, the decorative paper or foil, the elastomeric microsphere coated wood core panel and the thermoset paper backing layer would then be placed in a heated fast-cycle press to fuse the wear layer, the decorative foil, the prepared wood panel, and the backing layer into a laminate floor panel. Subsequent operations may include sizing, edge machining, inspection, and packaging.

As such, in a further aspect, the present invention provides a process for the production of a sound attenuating laminated panel, such as a laminated floor panel, having a laminate structure comprising a plurality of layers, wherein at least one of the layers of the laminated panel have been treated or replaced with an elastomeric coating, film or material, so as to form a treated layer, in order to reduce the noise generated by said panel.

Further, although the present invention aims at reducing or eliminating the noise created by a traditional laminate floor which includes rigid melamine-impregnated paper surfaces, it will be understood that sound reduction can also be achieved by applying an elastomeric coating to an existing laminate panel.

For laminate floor covering, and more particularly for each floor panel concerned, the same elastomeric coatings may be applied to decorative papers and foils or even wood veneers. Further, the elastomeric coating may be incorporated into the adhesive used for bonding the paper foil or wood veneer to an MDF, HDF or other particleboard panel with the goal of reducing noise around furniture by making the furniture panels sound absorbing or sound attenuating. Additionally, it will be noted that an elastomeric film or films may be substituted for the coating.

The invention also relates to laminate floor panels which may be produced with direct printing technology where the MDF or HDF panels are printed directly with an ink-jet printer or other printing methods and subsequently a translucent pre-impregnated thermoset paper wear layer is applied to the upper surface of the panel, and a pre-impregnated thermoset paper backing layer is applied to the lower surface of the panel.

The invention also relates to a method for realizing a floor panel, wherein the wear layer is a thermoplastic/thermoset elastomeric material instead of the usual thermoset melamine-impregnated paper wear layer. This wear layer would be inherently sound absorbing and could be assembled, for example, over a decorative paper or vinyl foil or over a directly printed panel MDF or HDF wood core, and a paper or thermoplastic balance layer.

Preferably, the floor panels are made according to the classic techniques for forming HPL (High Pressure Laminate) or DPL (Direct Pressure Laminate). With HPL, the individual layers of the planks or tiles are fixed together in separate stages. This technique uses a combination of both pressure and heat and the result is usually a wear layer that is thicker and therefore harder wearing than that of laminates made by Direct Pressure. If the flooring is made using the DPL method then the individual layers that make up the tiles or planks will first be arranged in their required position and then pressed and bonded together at the same time. Typically, the floor panels hereby are formed from larger "plates".

Typically, these plates would be comprised of (i) a pre-impregnated wear layer comprising a sheet formed from a resin impregnated paper sheet which may include aluminum oxide or other abrasion resistant particles with a (typically) thermosetting resin which sheet may be treated with an elastomeric coating or film; (ii) a decorative layer that may be treated with an elastomeric coating or film; (iii) an MDF or HDF base or core that may be treated with an elastomeric coating or film; and/or (iv) a lower balancing layer (or backer layer) consisting of a pre-impregnated paper layer comprising a sheet formed from a resin impregnated paper sheet with a thermosetting resin which sheet may be treated with an elastomeric coating or film, or optionally an elastomeric film or coating applied directly to the core layer. Other layers might also be included.

The application of an elastomeric coating or film may occur during the production of any or all of the components of the laminate assembly or in the manufacture of any or all of the individual components which comprise the laminated assembly. The loose assembly is subsequently transferred to a heated press and then compressed to form a whole laminated panel, whereby pre-impregnated (typically) thermosetting resins provide for adhesion and hardening and the thin elastomeric coating or film(s) act as the sound absorbing or attenuating layer(s).

Simultaneously to pressing, the laminated panel impressions are preferably applied, as the press, at the surface of the pressing part comes into contact with the upper side of the aforementioned plate. The pressing plate comprises the relief features which are typically desired in the production of a laminated floor panel. The resultant laminated floor panel thereby includes a thin sound-absorbing or attenuating coating on one or more layers, in order to reduce or eliminate sound transmission in accordance with the invention.

In a further embodiment, a thin elastomeric coating or film may also be applied to the edge surfaces that incorporate the panel joint. The type of joint may be a traditional tongue and groove joint, a click joint, a hinge type joint and any combination of these or any other type of joint system used to join two or more panels. Application of the elastomeric coating will act to further reduce noises created when the laminate floor panels are installed in a floating manner over a flexible foam or felt backing material that may also act as a vapor barrier. This further embodiment will also preferably act to reduce or eliminate any squeaking caused by flexing of the joint when walking over the floor.

The above-mentioned further embodiment will also act to seal the edges of the floor panel from moisture and again act to reduce or eliminate any potential for off-gassing of toxins such as formaldehyde, for example.

BRIEF DESCRIPTION OF THE DRAWINGS

With the intention of better showing the characteristics of the invention, hereafter, as an example without any limitative character, several preferred forms of embodiment are described, in the accompanying drawings, wherein.

DETAILED DESCRIPTION OF PREFERRED EMBODIMENTS

Figure 1:
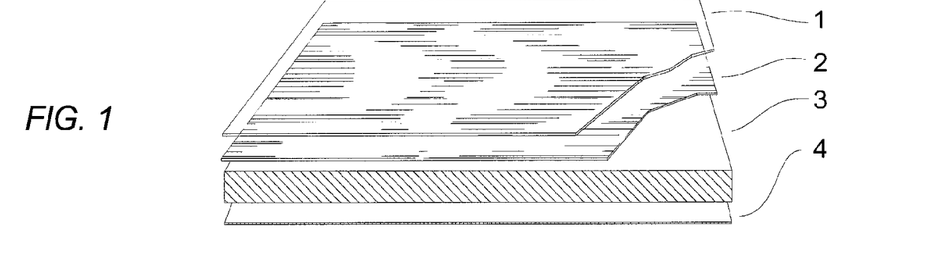
FIG. 1 represents a cross-sectional view of a typical laminate floor covering which is composed of layers including melamine impregnated papers.

FIG. 1 is an expanded 3-dimensional view of a typical laminate floor panel which incorporates a thermosetting melamine resin-impregnated wear layer 1 (which may incorporate abrasive particles), a decorative foil or paper 2 (which may be coated with a thermosetting resin), an MDF or HDF base or core panel 3 made from natural fibres and a thermosetting resin, and a thermosetting melamine resin-impregnated paper backer layer 4.

Figure 2:
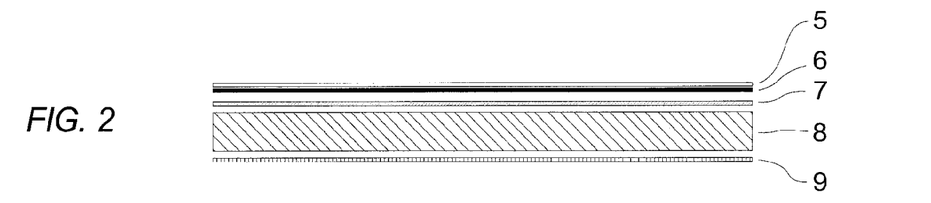
FIG. 2 represents showing a thin elastomeric coating or film applied to the underside of the transparent wear layer which has been pre-impregnated with an elastomeric solution polymer that penetrates into the paper, in accordance with one embodiment of the present invention.

FIG. 2 is an expanded cross sectional view of a laminate floor panel of the present invention which incorporates a thermosetting resin-impregnated paper wear layer 5 that has been pre-impregnated with an elastomeric solution polymer that penetrates into the paper which may incorporate abrasive particles, a thin transparent elastomeric coating or film for sound absorbing or attenuating properties 6 which has been pre-applied to wear layer 5, a decorative foil or paper 7 that has been pre-impregnated with an elastomeric solution polymer that penetrates into the paper which may be coated with a thermosetting resin, an MDF or HDF core panel 8 made from natural fibres and a thermosetting resin, and a thermosetting resin-impregnated paper backer layer 9 that has been pre-impregnated with an elastomeric solution polymer that penetrates into the paper.

Figure 3:
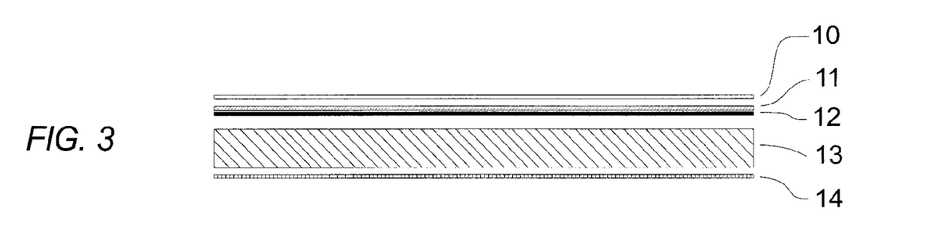
FIG. 3 show a thin elastomeric coating applied to the underside of the decorative paper layer which has been pre-impregnated with an elastomeric solution polymer that penetrates into the paper.

FIG. 3 is an expanded cross sectional view of a laminate floor panel which incorporates a thermosetting resin-impregnated paper wear layer 10 that has been pre-impregnated with an elastomeric solution polymer that penetrates into the paper and which may incorporate abrasive particles, a decorative foil or paper 11 that has been pre-impregnated with an elastomeric solution polymer that penetrates into the paper and which may be coated with a thermosetting resin, a thin elastomeric coating or film 12 for sound absorbing or attenuating properties which has been pre-applied to foil or paper 11, an MDF or HDF core panel 13 made from natural fibres and a thermosetting resin, and a thermosetting resin-impregnated paper backer layer 14 that has been pre-impregnated with an elastomeric solution polymer that penetrates into the paper.

Figure 4:
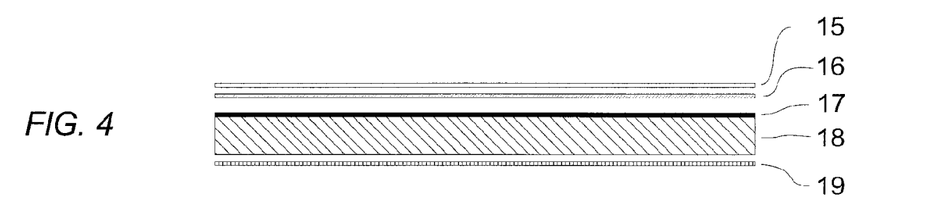
FIG. 4, shows an elastomeric coating or film applied to the upper surface of the MDF or HDF core.

FIG. 4 is an expanded cross sectional view of a laminate floor panel of the present invention which incorporates a thermosetting resin-impregnated wear layer 15 that has been pre-impregnated with an elastomeric solution polymer that penetrates into the paper and which may incorporate abrasive particles; a decorative foil or paper 16 that has been pre-impregnated with an elastomeric solution polymer that penetrates into the paper which may be coated with a thermosetting resin; a thin elastomeric coating or film 17 for sound absorbing or attenuating properties 17 which has been pre-applied to an MDF or HDF core panel 18; an MDF or HDF core panel 18 made from natural fibres and a thermosetting resin; and a thermosetting resin-impregnated paper backer layer 19 that has been pre-impregnated with an elastomeric solution polymer that penetrates into the paper.

Figure 5:
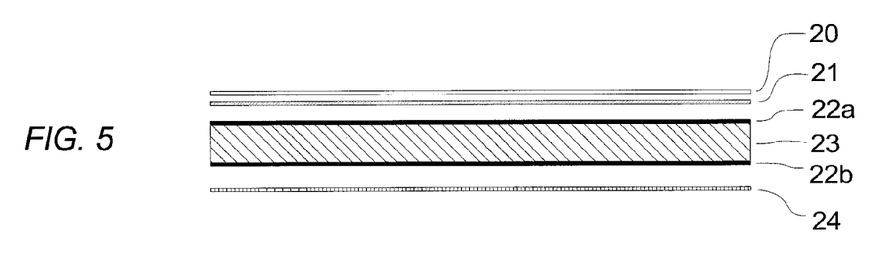
FIG. 5, shows a thin elastomeric coating or film applied to the upper and lower surfaces of the MDF or HDF panel.

FIG. 5 is an expanded cross sectional view of a laminate floor panel which incorporates a thermosetting resin-impregnated paper wear layer 20 that has been pre-impregnated with an elastomeric solution polymer that penetrates into the paper and which may incorporate abrasive particles, a decorative foil or paper 21 that has been pre-impregnated with an elastomeric solution polymer that penetrates into the paper and which may be coated with a thermosetting resin, a thin elastomeric coating or film 22a for sound absorbing or attenuating properties which has been pre-applied to the upper of an MDF or HDF core panel 23, a thin elastomeric coating or film 22b for sound absorbing or attenuating properties which has also been pre-applied to the lower surface of an MDF or HDF core panel 22b, and a thermosetting resin-impregnated paper backer layer 24 that has been pre-impregnated with an elastomeric solution polymer that penetrates into the paper.

Figure 6:
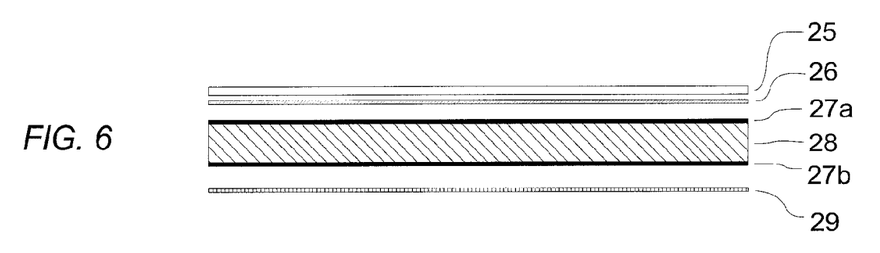
FIG. 6, shows a transparent thermoplastic wear layer applied over a printed paper that has been pre-impregnated with an elastomeric solution polymer that penetrates into the paper or vinyl decorative foil applied to the upper surface of the MDF or HDF panel.

FIG. 6 is an expanded cross sectional view of a laminate floor panel of the present invention which incorporates a transparent thermoplastic wear layer 25, a decorative foil or paper 26 that has been pre-impregnated with an elastomeric solution polymer that penetrates into the paper which may be coated with a thermosetting resin, a thin sound absorbing or attenuating elastomeric adhesive or film 27a which has been pre-applied to the upper of an MDF or HDF core panel 28, a thin sound absorbing or attenuating elastomeric adhesive or film 27b which has been pre-applied to the lower surface of an MDF or HDF core panel, and a thermosetting resin-impregnated paper or thermoplastic backer layer 29 that has been pre-impregnated with an elastomeric solution polymer that penetrates into the paper.

Figure 7:
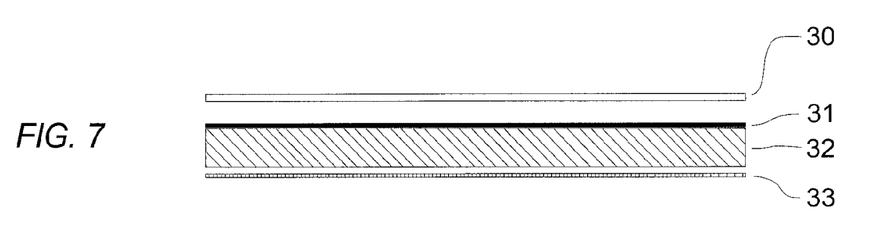
FIG. 7 shows an elastomeric coating or film applied as a wear layer, to the upper surface of a printed MDF or HDF core.

FIG. 7 is an expanded cross section view of a laminate floor panel of the present invention which incorporates an MDF or HDF core layer 32 with a backer layer 33. A decorative pattern 31 has been directly printed on to core layer 32, and an elastomerically modified wear layer 30 consisting of a translucent paper, is applied directly over the printed decorative pattern 31.

In all examples, the "elastomeric" resin could, in fact, be made from any thermoset or thermoplastic elastomeric material in various forms including liquid, solid, film, one component or multi-component; thermoset, thermoplastic (TPE), solution polymer or water-based or solvent-based dispersion and latexes. Either block or alternating or random copolymers may be used. The said material can be based on, but not limited to the following polymers, namely: PE, all grades (LLDPE, LDPE, MDPE, HDPE); Polyurethane; Polypropylene; Ethylene vinyl acetate; Ethylene vinyl alcohol; Polyester; Polyolefin (TPO); modified Melamine-based thermoset resins; ESI—ethylene styrene interpolymer or any of the styrene acrylic copolymers; rubber based materials, NBR (nitrile Butadiene), SBR (styrene butadiene), CR (chloroprene), silicone, fluorocarbon, acrylamide, epichlorohydrin, carboxylated, natural and synthetic latexes.

The thickness of the elastomeric coating is preferably from 1 micron to 3 mm, but thinner or thicker coatings might also be used. The application of the elastomeric material shall not be limited to the coating of the core or the layering papers top or bottom. The elastomeric material may comprise of a modified paper or flexible foil or a paper or foil with an elastomeric coating.

As such, the elastomeric thermosetting resin could also be a flexible resin system used to coat or impregnate any or all of the paper or core layers, and/or combinations thereof. Preferably, this elastomeric material may be in the form of a water-based dispersion or a water-based or solvent-based solution polymer which by itself may have defined limits of elongation of 0-2000%, a 100% modulus between 0-1500 psi, and a tensile strength between 0-8000 psi by ASTM D-412

According to a variant, the elastomeric material and the decorative layer, already before their application on the base (or core) panel, may consist of a single layer, for example, in that the decorative layer is soaked such that sufficient elastomeric material is present thereupon to provide the sound absorbing properties therein. It is also not excluded to start from a layer of elastomeric material which is provided with a decorative layer at the underside, which layer is exclusively formed by a print. The term print must be interpreted in the broadest sense, and thereby any technique is intended to provide for a decorative top surface for the panel.

Also, a white paper, that has been pre-impregnated with an elastomeric solution polymer that penetrates into the paper and subsequently coated with an elastomeric resin may be applied to the HDF or MDF core panel for the purposes of forming a neutral background if a direct printing technique is used to decorate the panel.

A transparent wear layer consisting of a thermoplastic material such as PVC (polyvinyl chloride), TPO (thermoplastic olefin), or Polypropylene in various thicknesses may also be applied over the decorative papers or printed surface to act as the wear layer depending upon the desired performance properties.

The laminated assembly as described herein refers to a core panel such as HDF or MDF material made from natural fibers using PMDI or formaldehyde, other binders and other additives including waxes, as described herein, and must be interpreted in the broadest sense. Variations in the type of natural fibers to produce the core panel, the density of the natural fiber based core panel, the use of different resins or bonding agents, composites made with combinations of different fibers, and core panels made from other materials which may be synthetic or metallic such as extruded plastics and flexible core materials, may further all benefit from the invention described herein aimed at reducing noise and absorbing sound when objects come into direct or indirect contact with the panel.

The elastomeric film or coating may be applied in a web pattern in such a way as to further increase or modify the sound absorption properties.

EXAMPLE

Example 1

Dry milled hardwood fibers (650 g) with an average diameter of 0.5 mm and a moisture content of 5% were used to produce the sample. The fibers were blended with polymeric diisocyanate (PMDI) resin (42 g) (MR Lite from Bayer), which is reactive at elevated temperature. The isocyanate then added to the hardwood fibers in a mixer bowl at room temperature (26° C.), and the materials were blended for approximately 8 minutes in a lab mixer fitted with a single oscillating mix blade. The resultant binder-coated fibers were sprinkled uniformly by hand into a 30×30 cm (L×W) frame and compacted in a platen press and pressed to the intended thickness of 7.5 mm at a pressure of up to 68 bar for 150 sec at 130° C. The resulting 7.5 mm thick sample panel was rigid and exhibited a hardness of 78 on the Shore D scale. The hot board was placed on a wire cooling grill.

After cooling, a portion of one side of the upper surface of the board was treated with a flexible elastomeric coating comprised of an aliphatic water-based polyurethane polyester-based dispersion having an elongation of 400% with a 100% modulus of 800 psi, and a tensile strength of 4000 psi, and allowed to dry.

Decorative papers printed with a woodgrain pattern with a weight of approximately 65 g/m2 as normally used in the production of laminate flooring were cut to 20×30 cm size. A laboratory roller impregnator that consisted of a metal tray under an assembly with two rollers was used. A pre-impregnation solution bath was prepared consisting of 50% $H_2O$ and 50% WB-90 PURchem Solution Polymer and poured into the tray. Each sheet was placed in the solution polymer and gently pulled between the rollers to remove any excess. The sheets were dried to remove excess moisture in an oven with a temperature of 90° C. for 3 minutes.

A second bath with a solution was prepared consisting of 20% $H_2O$ and 80% WB-100 PURchem Polyurethane Water-Based Dispersion and poured into the tray. Each sheet was placed in the solution polymer and gently pulled between the rollers to remove any excess. The sheets were dried to remove excess moisture in an oven with a temperature of 90° C. for 3 minutes.

The decorative papers were coated with a solution consisting of 10% $H_2O$ and 80% WB-110 PURchem Polyurethane Water-based Dispersion resin with Internal Mold Release (IMR)+10% of Corundum particles (Al2O3) with internal mold release. Each sheet was placed in the solution and gently pulled between the rollers to remove any excess. The sheets were dried to remove excess moisture in an oven with a temperature of 90° C. for 3 minutes. The dried decorative sheets were set aside.

Once the sheets were pre-impregnated and subsequently dried, the loose assembly consisting of the 7.5 mm thick wood core board as described above, the impregnated decorative sheet, and an impregnated kraft paper backing sheet was placed in 100 ton heated hydraulic press with upper and lower platens having a surface temperature of 150° C. The press machine was equipped with a chromium-plated steel press plate having a woodgrain texture installed on one surface that is designed to make impressions into the printed decorative paper. The press was closed with a surface pressure of 45 kg/m2 for 20 seconds to cure and bond the loose assembly forming a laminate floor panel sample with a wood-grain design and corresponding surface texture with the wood core board. Combined, the sheets in this example had a film build of 150 g per m2.

It should be noted that this amount is completely variable dependent upon the desired level of sound absorption required.

As the end of the cycle, the sample was removed from the press, allowed to cool and cut to the desired dimensions.

The uncoated and coated samples from the same board, examples CONTROL and FP1 (coated) were tested for sound.

Brief Description of the Sound Test

Figure 8:
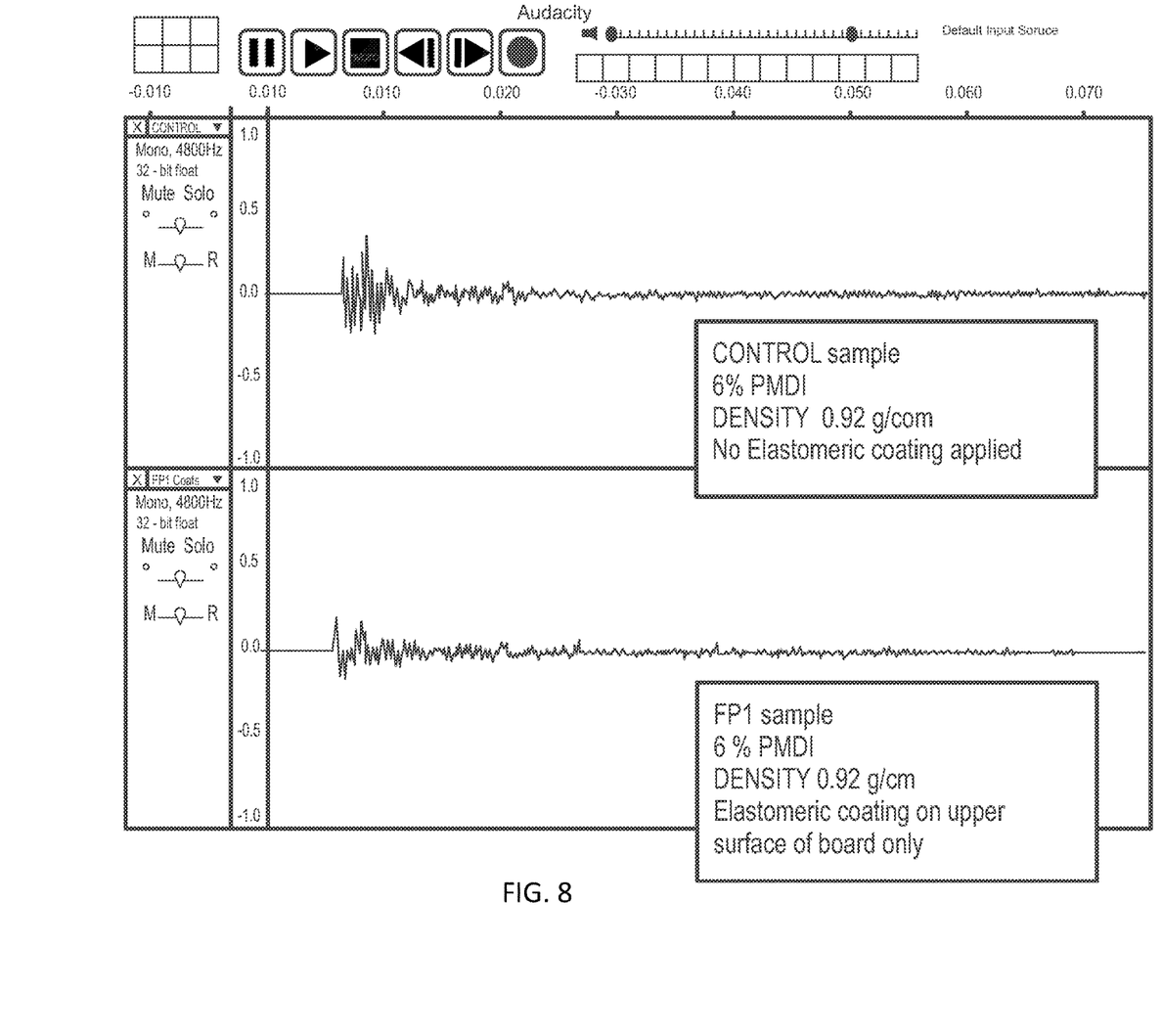
FIG. 8 shows a sound wave generated by a single impact to an elastomeric coated sample, according to the present invention

The results of the sound comparison for Example 1 is shown in the accompanying drawing. FIG. 8 depicts the sound waves based on a single impact to an elastomeric coated sample "FP1", and uncoated test sample "CONTROL" which were cut from the same base panel.

A sound testing device consisting of a push-button switch, a 9 volt battery and a small solenoid with a light spring-retraction mechanism, surrounded by foam insulation and housed in a plastic box isolated from the sample surface with rubber pads was used to produce the ping sounds. Upon closing the circuit, electrical current creates a magnetic field in the solenoid moving the spring-retractable core rod through a hole in bottom of the plastic box to strike the surface of the test piece.

The sound recordings were made using the program Audacity, with an Apple MacBook Pro laptop computer. Individual samples CONTROL and FP1 were placed directly in front of the built-in computer microphone. Each sample was placed on a sheet of 2 mm thick foam laminate floor underlay material (typical of what would be used as underlay material in the industry).

The CONTROL sample exhibits significantly more concentrated sound waves for a longer time period. The FP1 sample is significantly quieter. The sound pattern represented in the FIG. 8 shows a decrease on the decibel rating by approximately 30%, a lower pitch, and significant reduction in the overall length of the sound pattern.

Samples with additional elastomeric coatings will have even better sound absorption or attenuating properties enabling someone skilled in the art to tune out unwanted noise reduce reverberation within the panel.

The present invention is in no way limited to the forms of embodiment described as an example and represented in the figures. On the contrary, the present invention, including floor covering, and more particularly said panels, as well as the methods described herein, may be realized in different variants without leaving the scope of the invention.

Thus, there has been provided, in accordance with the present invention, a sound attenuating laminated flooring material, and a process for producing such a sound attenuating laminated flooring material which fully satisfies the goals, objects, and advantages set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims. Unless otherwise specifically noted, the features described herein may be combined with any of the above aspects, in any combination.

Additionally, for clarity and unless otherwise stated, the word "comprise" and variations of the word such as "comprising" and "comprises", when used in the description and claims of the present specification, is not intended to exclude other additives, components, integers or steps. Moreover, the words "substantially" or "essentially", when used with an adjective or adverb is intended to enhance the scope of the particular characteristic; e.g., substantially planar is intended to mean planar, nearly planar and/or exhibiting characteristics associated with a planar element.

Further, use of the terms "he", "him", or "his", is not intended to be specifically directed to persons of the masculine gender, and could easily be read as "she", "her", or "hers", respectively. Also, while this discussion has addressed prior art known to the inventor, it is not an admission that all art discussed is citable against the present application.

The invention claimed is:

1. A floor panel comprising:
a core having a first side and a second side; and
one or more layers positioned on the first side of the core, wherein the one or more layers comprises a decorative pattern and an elastomeric material.

2. A floor panel as claimed in claim 1, wherein the elastomeric material comprises a natural or synthetic resin with elastomeric properties and is based on a one component or multi-component, thermoset, thermoplastic (TPE), or polymer.

3. A floor panel as claimed in claim 2, wherein the elastomeric material comprises a resin based on polyurethane resins, polyethylene resins, Polypropylene resins, Ethylene vinyl acetate resins, Ethylene vinyl alcohol resins, Polyester resins, Polyolefin (TPO) resins, modified Melamime-based thermoset resins, ESI—ethylene styrene interpolymer reins, styrene acrylic copolymer resins, or resins based on rubber based materials, NBR (nitrile Butadiene), SBR (styrene butadiene), CR (chloroprene), silicone, fluorocarbon, acrylamide, epichlorohydrin, or is based on carboxylated, natural and synthetic latexes.

4. A floor panel as claimed in claim 3,
wherein the core has been coated with the elastomeric material in the form of a water-based dispersion or a water-based or solvent based solution polymer, or
the coating of the elastomeric material on the treated layer has been applied as a coating in the form of a water-based dispersion or a water-based or solvent based solution polymer.

5. A floor panel as claimed in claim 1, wherein the one or more layers comprises an elastomeric material layer having a thickness of from 1 micron to 3 mm.

6. A floor panel as claimed in claim 5, wherein the elastomeric material has defined limits of elongation of 0-2000%, a 100% modulus between 0-1500 psi, and a tensile strength between 0-8000 psi by ASTM D-412.

7. A floor panel as claimed in claim 1, wherein the elastomeric material comprises translucent paper.

8. A floor panel as claimed in claim 1, further comprising a backer layer positioned on the second side of the core.

9. A floor panel as claimed in claim 1, wherein the one or more layers include a layer of the decorative pattern and a layer of the elastomeric material.

10. A floor panel as claimed in claim 1, wherein the decorative pattern and the elastomeric material are within a single layer on the first side of the core.

11. A floor panel as claimed in claim 10, wherein the decorative pattern is within a single layer penetrated with the elastomeric material.

12. A floor panel as claimed in claim 1, wherein the core is made of one of plastic, synthetic material, composite, or metal.

13. A floor panel as claimed in claim 1, wherein the core comprises one of an extruded plastic or a plastic with filler.

14. A method of making a floor panel, the method comprising:
providing a core having a first side and a second side; and
positioning one or more layers on the first side of the core,
wherein the one or more layers comprises a decorative pattern and an elastomeric material.

15. A method as claimed in claim 14, A floor panel as claimed in claim 12, wherein the elastomeric material comprises a natural or synthetic resin with elastomeric properties and is based on a one component or multi-component, thermoset, thermoplastic (TPE), or polymer.

16. A method as claimed in claim 14, wherein the elastomeric material comprises a resin based on polyurethane resins, polyethylene resins, Polypropylene resins, Ethylene vinyl acetate resins, Ethylene vinyl alcohol resins, Polyester resins, Polyolefin (TPO) resins, modified Melamime-based thermoset resins, ESI—ethylene styrene interpolymer reins, styrene acrylic copolymer resins, or resins based on rubber based materials, NBR (nitrile Butadiene), SBR (styrene butadiene), CR (chloroprene), silicone, fluorocarbon, acrylamide, epichlorohydrin, or is based on carboxylated, natural and synthetic latexes.

17. A method as claimed in claim 16, wherein the elastomeric material comprises plastic or other materials.

18. A method as claimed in claim 16,
wherein the core has been coated with the elastomeric material in the form of a water-based dispersion or a water-based or solvent based solution polymer, or
the coating of the elastomeric material on the treated layer has been applied as a coating in the form of a water-based dispersion or a water-based or solvent based solution polymer.

19. A method as claimed in claim 14, wherein the one or more layers comprises an elastomeric material layer having a thickness of from 1 micron to 3 mm.

20. A method as claimed in claim 18, wherein the elastomeric material has defined limits of elongation of 0-2000%, a 100% modulus between 0-1500 psi, and a tensile strength between 0-8000 psi by ASTM D-412.

21. A method as claimed in claim 14, wherein the elastomeric material comprises translucent paper.

22. A method as claimed in claim 14, further comprising positioning a backer layer on the second side of the core.

23. A method as claimed in claim 14, wherein the one or more layers include a layer of the decorative pattern and a layer of the elastomeric material.

24. A method as claimed in claim 14, wherein the decorative pattern and the elastomeric material are within a single layer on the first side of the core.

25. A method as claimed in claim 24, wherein the decorative pattern is within a single layer penetrated with the elastomeric material.

26. A method as claimed in claim 14, wherein the core is made of one of plastic, synthetic material, plastic, or metal.

27. A method as claimed in claim 14, wherein the core comprises one of an extruded plastic or a plastic with filler.

* * * * *